Patented Apr. 22, 1930

1,755,864

UNITED STATES PATENT OFFICE

ELMER B. BROWN, CHARLES N. FREY, AND HARVEY H. HARKINS, OF NEW YORK, N. Y., ASSIGNORS, BY MESNE ASSIGNMENTS, TO STANDARD BRANDS INCORPORATED, OF DOVER, DELAWARE, A CORPORATION OF DELAWARE

FOOD PRODUCT

No Drawing. Application filed September 2, 1927. Serial No. 217,308.

This invention relates to food products and processes of producing the same, and more particularly, to a material suitable for use as a bread dough ingredient in place of, or in conjunction with, the usual sugar material added to the dough mix.

A general object of the invention is to provide a product having improved color, flavor and keeping qualities, which is highly nutritious and which is prepared in a convenient, efficient and economical manner.

Other objects of the invention will in part be obvious and will in part appear hereinafter.

The invention accordingly comprises the several steps and the relation and order of one or more of such steps with respect to each of the others, and the product possessing the features, properties and the relation of constituents, which are exemplified in the following detailed disclosure, and the scope of the application of which will be indicated in the claims.

In the commercial manufacture of leavened white bread it is desirable that the dough ingredients be such as to produce a loaf not only of good odor, taste, keeping qualities and texture of crumb, but that the loaf shall have a light-colored interior and a crust color approaching a golden brown. It is believed that these last two qualities depend largely upon the sugar material used. It is therefore requisite that such sugar material must be so light in color as not to discolor the loaf interior and must, under the conditions of baking, contribute to the formation of a desirable crust color.

The acid hydrolysis of starch to produce dextrose or glucose has long been known, and sugar materials which have been thus produced are readily available on the market. These materials have, however, not been used in bread making, largely for the reason that when used as the sugar material the bread loaf produced lacks sufficient depth of crust color.

In accordance with the present invention a sugar-containing product is produced by the hydrolysis of a mixture of starch and yeast. The hydrolysis of such a mixture produces a palatable and highly nutritious product, which, when used in bread making, not only increases the food value of the bread, but also aids in maturing the dough; increases the expansion of the loaves and decreases the fermentation time.

The product thus produced, when evaporated to the consistency of ordinary syrups of this type (about 80° Balling), contains a considerable portion of dextrose, but also contains certain desirable components of the yeast. Consequently, it is sufficiently light in color as not undesirably to affect the interior of the loaf and yet produces a beautiful golden crust color at least equal to that produced when cane sugar is used.

While the process is capable of wide variations without departing from the spirit of the invention, and without wishing to be limited to the specific details thereof, the following example is given:

600 pounds of water are placed in a cooker and 6 to 10 pounds of concentrated hydrochloric acid are added. After preferably heating the mixture to approximately 100° C., 200 pounds of starch and from 10 to 20 pounds of yeast are added while stirring. The resulting mixture is then subjected to heat and pressure until the starch is substantially completely converted into sugar. For example, with a pressure of 15 pounds, 2 hours are sufficient for the completion of the reaction, and with higher pressures less time is required. When the cooking is completed, the pressure is gradually released and the mixture cooled below the boiling point in the usual manner. Thereafter, the acidity is neutralized preferably with ammonia, and, if desired, the product is again acidified with lactic acid, about ½% of the weight of the starch, in the present example—about 1 pound of lactic acid, being sufficient. The mass is then filtered or otherwise suitably separated, and the filtrate is concentrated in vacuo to a syrup of the desired density. Although a light-colored syrup is thus obtained, the color may, if desired, be further improved by passing the extract over any suitable decolorizing agent, such as charcoal, bone-black, Norit, etc., prior to the concentration thereof.

It will be understood that acids other than hydrochloric can be used as the hydrolizing agent, such as, for example, sulphuric acid, and, in fact, mixtures of hydrochloric and sulphuric acid have been found to be particularly desirable, not only from the standpoint of their efficiency in the step of hydrolysis, but also because of the desirable balance of salts which are present in the final product due to the neutralization of the acids. When the mixture is used in the above example, about 4 pounds of concentrated hydrochloric acid and 3 pounds of sulphuric acid will be sufficient.

Although ammonia has been mentioned as the specific neutralizing agent in the above example, yet it will be obvious that other suitable neutralizing agents, such as calcium carbonate or lime, may be used in whole or in part.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described our invention, what we claim as new and desire to secure by Letters Patent is:

1. As a new article of manufacture, a composition of matter comprising an extract of the acid hydrolysis of a mixture of starch and yeast.

2. As a bread dough ingredient, a composition of matter comprising an extract of the acid hydrolysis of a mixture of starch and yeast, the acids of which have been neutralized after the hydrolysis, and the extract concentrated.

3. As a bread dough ingredient, a composition of matter comprising an extract of the acid hydrolysis of a mixture of starch and yeast, the acids of which have been neutralized with ammonia after the hydrolysis, and the extract concentrated.

4. The process of making a food product which comprises hydrolizing a mixture of starch and yeast with dilute acid.

5. The process of making a food product which comprises hydrolizing a mixture of starch and yeast with dilute acid while heating under pressure.

6. The process of making a food product which comprises hydrolizing a mixture of starch and yeast with dilute acid while heating under pressure until the starch has been substantially completely converted into sugar, neutralizing the acidity, filtering, and concentrating.

7. The process of making a food product, which comprises hydrolizing a mixture of starch and yeast with dilute acid while heating under pressure until the starch has been substantially completely converted into sugar, neutralizing the acidity, acidifying slightly with lactic acid, filtering and concentrating.

8. The process of making a food product, which comprises hydrolizing a mixture of starch and yeast with dilute acid while heating under pressure until the starch has been substantially completely converted into sugar, neutralizing the acidity with ammonia, filtering and concentrating.

9. The process of making a food product, which comprises hydrolizing a mixture of starch and yeast with dilute acid while heating under pressure until the starch has been substantially completely converted into sugar, neutralizing the acidity with ammonia, acidifying slightly with lactic acid, filtering and concentrating.

10. The process of making a food product, which comprises hydrolizing a mixture of starch and yeast with a mixture of dilut hydrochloric and sulphuric acids, neutralizing with ammonia, filtering and concentrating.

In testimony whereof we affix our signatures.

ELMER B. BROWN.
CHARLES N. FREY.
HARVEY H. HARKINS.